UNITED STATES PATENT OFFICE.

GEORGE THOMAS HOLLOWAY, OF LONDON, ENGLAND.

PROCESS FOR THE TREATMENT OF SLAG FROM TIN-SMELTING FURNACES.

No. 891,477.     Specification of Letters Patent.     Patented June 23, 1908.

Application filed February 10, 1908. Serial No. 415,116.

*To all whom it may concern:*

Be it known that I, GEORGE THOMAS HOLLOWAY, a subject of the King of Great Britain and Ireland, residing at 57 Chancery Lane, London, W. C., have invented a new or Improved Process for the Treatment of Slags from Tin-Smelting Furnaces, of which the following is a specification.

This invention relates to the economic utilization of the slags obtained in the ordinary operation of smelting tin ores in reverberators or blast furnaces, whereby a large proportion of such tin is contained in the slag as metal or as a compound of tin is recovered in a form convenient for use.

The invention consists in the production of an alloy of tin and iron by the smelting of the tin slag according to the ordinary method employed in blast furnaces for the reduction of ore to metal. Such alloy may be employed for the production of metallic tin or of salts or other compounds of tin or for the production of type metal, solder, bearing metal or other useful alloy containing tin or may be smelted with tin ore or with the slags obtained in the ordinary process of smelting tin ore.

In carrying the invention into effect I employ the ordinary tin slag which contains a small amount of free metallic tin together with silicates of iron, tin, lime etc., and usually, with some tungsten, nickel, cobalt and other metals commonly occurring in tin ores. I smelt this slag in a blast furnace which may be similar to the ordinary blast furnace used for smelting iron ores, with the addition, if necessary according to the actual composition of the slag, of lime or lime-stone or other suitable flux and with the addition also of iron ore, if there be not sufficient iron already present in the slag to produce the alloy; coal, coke, wood, gas or oil fuel being employed as a source of heat and as a reducing agent. A proportion of the iron and the maximum possible proportion of the tin are thus reduced together and the alloy produced is tapped off as usual at the bottom of the furnace, the slag being also tapped off and used for any suitable purpose or thrown away. The alloy produced may contain in addition to the tin and iron, a considerable proportion of such tungsten, nickel, cobalt or other reducible metal as may have been present in the original slag.

In my experiments, I have obtained alloys containing various proportions of tin and iron *e. g.* from about 5% of tin with about 90% of iron, to over 30% tin with 60 to 70% of iron but I prefer so to determine the content of iron in the furnace charge as to produce an alloy, as rich in tin as the nature of the slag allows without undue loss of that metal, the remainder of the alloy being mainly iron. To obtain this result a slag containing for example, about 20% of iron to 6% of tin may be employed, but the proportion of iron to tin varies widely according to the kind of slag. In all cases however a large proportion, say over 20% of iron is usually present in the slag.

This alloy may be used in the production of ordinary metallic tin or of tin salts or other compounds containing tin, or of tin-lead, tin-antimony or tin-antimony-lead or other alloys containing tin, in various ways, for example.—

1. It may be added in the smelting of ordinary tin ore to assist the reduction and smelting of the ore and to augment the amount of tin recovered from the ore.

2. It may be smelted with ordinary tin-slags instead of or in addition to the metallic iron or iron ore which is sometimes used in "cleaning" tin-slags, to extract as much of the tin therefrom as possible. The tin in my alloy is thereby largely recovered as crude tin together with much of that which was present in the slag.

3. It may be treated electrolytically for the production of metallic tin or compounds containing tin.

4. It may be treated, either raw or after oxidation, with alkaline or other solutions for the production of stannate of soda or potash or of chlorid or other salt or compound of tin.

5. It may be smelted direct or with the addition of fluxes etc., as may be necessary, with the sulfid ores or oxidized ores of lead, antimony or other suitable reducible metal or with the substances obtained as drosses, slags, etc., in the smelting, refining, melting etc., of ores, alloys or substances containing tin, lead, antimony or other reducible metal, whereby the tin in my alloy is reduced and alloyed with the metal or metals in such ore, dross etc. In this way, alloys of tin with lead or antimony or with both metals or with such other reducible metal or metals as may be present in the mixture smelted are produced. The materials may be mixed in such proportions as will produce such an alloy as type-metal, solder, bearing-metal etc., or, after its composition has been determined, it may be alloyed with tin, lead antimony or other metal to produce an alloy of the required composition.

What I claim as my invention and desire to secure by Letters Patent is:—

A process of producing an alloy of tin and iron consisting in charging a blast furnace with tin slag and with fuel, subjecting the charge to a blast of air whereby a proportion of the iron and a maximum proportion of tin are reduced together, and tapping off the alloy produced.

In testimony whereof I have hereunto signed my name to this specification in the presence of two subscribing witnesses.

GEORGE THOMAS HOLLOWAY.

Witnesses:
JOHN W. STRUDWICK,
H. D. JAMESON.